United States Patent
Greenberg et al.

(10) Patent No.: US 12,154,001 B2
(45) Date of Patent: Nov. 26, 2024

(54) PARAMETER EXTRAPOLATION IN QUANTUM VARIATIONAL CIRCUITS

(71) Applicant: International Business Machines Corporation, Armonk, NY (US)

(72) Inventors: Don Greenberg, Teaneck, NJ (US); Marco Pistoia, Amawalk, NY (US); Ivano Tavernelli, Wädenswil (CH); Jay M. Gambetta, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1105 days.

(21) Appl. No.: 16/354,725

(22) Filed: Mar. 15, 2019

(65) Prior Publication Data
US 2020/0293935 A1    Sep. 17, 2020

(51) Int. Cl.
*G06N 10/00*  (2022.01)
*G06N 7/01*   (2023.01)
*G06N 7/02*   (2006.01)
*G06N 7/08*   (2006.01)

(52) U.S. Cl.
CPC ............... *G06N 10/00* (2019.01); *G06N 7/01* (2023.01); *G06N 7/026* (2013.01); *G06N 7/08* (2013.01)

(58) Field of Classification Search
CPC ........ G06N 10/00; G06N 7/005; G06N 7/026; G06N 7/08
See application file for complete search history.

(56) References Cited

U.S. PATENT DOCUMENTS

| | | |
|---|---|---|
| 6,914,801 B2 | 7/2005 | Kostylev et al. |
| 7,778,066 B2 | 8/2010 | Horii et al. |
| 7,830,705 B2 | 11/2010 | Jeong |
| 7,978,508 B2 | 7/2011 | Czubatyj |
| 9,472,274 B1 | 10/2016 | Lung |
| 2017/0351967 A1 | 12/2017 | Babbush et al. |
| 2018/0096085 A1 | 4/2018 | Rubin |
| 2018/0165601 A1 | 6/2018 | Wiebe et al. |

(Continued)

FOREIGN PATENT DOCUMENTS

| | | |
|---|---|---|
| EP | 2 249 351 A1 | 11/2010 |
| WO | 2006026985 A2 | 3/2006 |

OTHER PUBLICATIONS

Kandala et al, Hardware-efficient Variational Quantum Eignesolver for Small Molecules and Quantum Magnets, Oct. 2017. (Year: 2017).*

(Continued)

*Primary Examiner* — Marshall L Werner
(74) *Attorney, Agent, or Firm* — Amin, Turocy & Watson, LLP

(57) ABSTRACT

According to an embodiment, a system can comprise a memory that stores computer executable components and a processor that executes the computer executable components stored in the memory. The computer executable components can comprise an extrapolation component that extrapolates a system parameter of a parameter set to determine a starting parameter value of a variational circuit. The computer executable components can further comprise a variational component that determines a system parameter value of the parameter set based on the starting parameter value.

25 Claims, 10 Drawing Sheets

(56) References Cited

U.S. PATENT DOCUMENTS

2018/0232652 A1     8/2018   Curtis et al.
2019/0019099 A1     1/2019   Hoskinson et al.

OTHER PUBLICATIONS

Kandala et al., Hardware-efficient Variational Quantum Eigensolver for Small Molecules and Quantum Magnets, Oct. 2017 (Year: 2017).*
Moll et al., Quantum Optimization Using Variational Algorithms on Near-Term Quantum Devices, Oct. 2017. (Year: 2017).*
Cao et al., Quantum Chemistry in the Age of Quantum Computing, Dec. 2018. (Year: 2018).*
Wang, et al., A Generalized Variational Quantum Eigensolver, Jun. 25, 2018, 10 pages.
Herbert, et al., Accelerated, energy-conserving Born-Oppenheimer molecular dynamics via Fock matrix extrapolation, Phys. Chem. Chem. Phys., Aug. 12, 2005, pp. 3269-3275.
Suri et al., "Impact of PCM Resistance-drift in Neuromorphic Systems and Drift-mitigation Strategy", IEEE, International Symposium on Nanoscale Architectures, 2013, 7 pages.

* cited by examiner

```python
import numpy as np
from qiskit_chemistry import QiskitChemistry qiskit_chemistry_dict = {
    "driver": { "name": "PYSCF" },
    "PYSCF": { "atom": "", "basis": "sto3g" },
    "operator": {
        "name": "hamiltonian",
        "qubit_mapping": "parity",
        "two_qubit_reduction": True,
        "freeze_core": True,
        "orbital_reduction": [-3, -2]
    },
    "algorithm": { "name": "VQE" },
    "optimizer": { "name": "COBYLA", "maxiter": 10000 },
    "variational_form": { "name": "UCCSD" },
    "initial_state": { "name": "HartreeFock" }
}
molecule = "H .0 .0 -{0}; Li .0 .0 {0}"

pts  = [x * 0.1  for x in range(6, 20)]
pts += [x * 0.25 for x in range(8, 16)]
pts += [4.0]
energies = np.empty(len(pts))
distances = np.empty(len(pts))
dipoles = np.empty(len(pts))

for i, d in enumerate(pts):
    qiskit_chemistry_dict["PYSCF"]["atom"] = molecule.format(d/2)
    solver = QiskitChemistry()
    result = solver.run(qiskit_chemistry_dict)
    energies[i] = result["energy"]
    dipoles[i] = result["total_dipole_moment"] / 0.393430307
    distances[i] = d for j in range(len(distances)):
    print("{:0.2f}: Energy={:0.8f}, Dipole={:0.5f}".format(distances[j], energies[j], dipoles[j]))
```

FIG. 3

PARAMETER EXTRAPOLATION IN QUANTUM VARIATIONAL CIRCUITS

BACKGROUND

The subject disclosure relates to parameter extrapolation and variational problems, and more specifically, to system parameter extrapolation in quantum variational circuits.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, and/or computer program products that can facilitate parameter set optimization based on system parameter extrapolation are described.

According to an embodiment, a system can comprise a memory that stores computer executable components and a processor that executes the computer executable components stored in the memory. The computer executable components can comprise an extrapolation component that extrapolates a system parameter of a parameter set to determine a starting parameter value of a variational circuit. The computer executable components can further comprise a variational component that determines a system parameter value of the parameter set based on the starting parameter value.

According to another embodiment, a computer-implemented method can comprise extrapolating, by a system operatively coupled to a processor, a system parameter of a parameter set to determine a starting parameter value of a variational circuit. The computer-implemented method can further comprise determining, by the system, a system parameter value of the parameter set based on the starting parameter value.

According to another embodiment, a computer program product that can facilitate parameter set optimization based on system parameter extrapolation. The computer program product can comprise a computer readable storage medium having program instructions embodied therewith, the program instructions can be executable by a processor to cause the processor to extrapolate, by the processor, a system parameter of a parameter set to determine a starting parameter value of a variational circuit. The program instructions can be further executable by the processor to cause the processor to determine, by the processor, a system parameter value of the parameter set based on the starting parameter value.

According to an embodiment, a system can comprise a memory that stores computer executable components and a processor that executes the computer executable components stored in the memory. The computer executable components can comprise an extrapolation component that extrapolates a rotational parameter of a molecular geometry parameter set to determine a starting parameter value of a variational circuit. The computer executable components can further comprise a variational component that determines a rotational parameter value of the molecular geometry parameter set based on the starting parameter value.

According to another embodiment, a computer-implemented method can comprise extrapolating, by a system operatively coupled to a processor, a rotational parameter of a molecular geometry parameter set to determine a starting parameter value of a variational circuit. The computer-implemented method can further comprise determining, by the system, a rotational parameter value of the molecular geometry parameter set based on the starting parameter value.

DESCRIPTION OF THE DRAWINGS

FIG. 3 illustrates an example, non-limiting script that can facilitate parameter set optimization based on system parameter extrapolation in accordance with one or more embodiments described herein.

DETAILED DESCRIPTION

Figure 1:
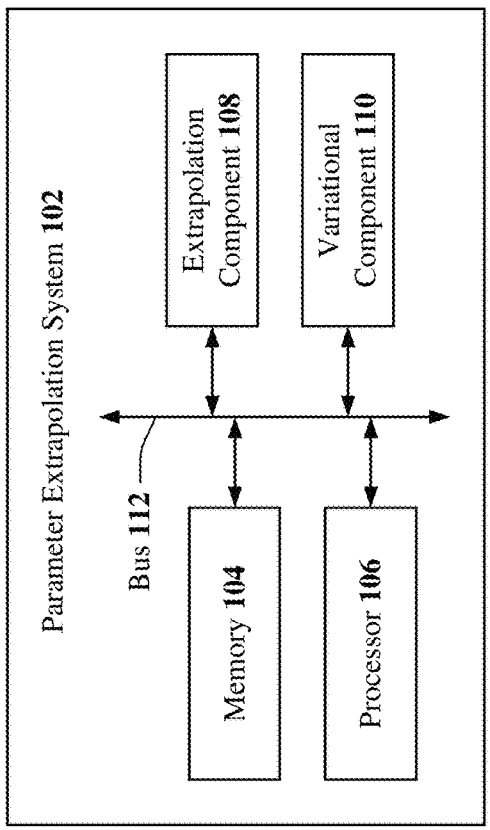
FIG. 1 illustrates a block diagram of an example, non-limiting system that can facilitate parameter set optimization based on system parameter extrapolation in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It is noted that the drawings of the present application are provided for illustrative purposes only and, as such, the drawings are not drawn to scale.

Quantum computing is generally the use of quantum-mechanical phenomena for the purpose of performing computing and information processing functions. Quantum computing can be viewed in contrast to classical computing, which generally operates on binary values with transistors. That is, while classical computers can operate on bit values that are either 0 or 1, quantum computers operate on quantum bits that comprise superpositions of both 0 and 1, can entangle multiple quantum bits (qubits), and use interference.

In the field of quantum information theory and as referenced herein, a quantum circuit can be a model used to perform quantum computation, where such a computation can be a sequence of quantum gates. As referenced herein, a variational circuit (also referred to herein as a parameterized quantum circuit) can comprise a hybrid quantum-classical algorithm comprising a quantum circuit that depends on a set of circuit parameters and further comprising an objective function that defines a scalar score of each discrete set of parameters. The goal in implementing such a variational circuit is to train or optimize the circuit with respect to the objective. For example, such a variational circuit can be trained using a classical optimization algorithm that queries a quantum device (e.g., a quantum computer, quantum processor, etc.) and optimized using an iterative scheme that can determine better parameter candidates in each step, starting with random or pre-trained initial parameters (also referred to herein as starting parameters).

Solutions to variational problems can be determined using, for example, a variational circuit defined above, where such solutions can comprise a set of rotational parameters (e.g., real numbers) which are found to parameterize a variational circuit that optimally solves the problem. In chemistry, for example, a solution is comprised of distinct rotational parameters solving each point in a set of related molecular geometries. In practice, these parameters are related due to structural similarities between the Hamiltonian operators represented by nearby geometries.

An example existing technique known as "bootstrapping" reuses the optimal rotational parameters (e.g., maximum or minimum rotational parameter values) from one geometry as the starting point for searching for optimal rotational parameters for another nearby geometry. This is a valuable technique because in practice, finding optimal rotational parameters is very difficult; as the search space is highly dimensional and non-convex in nearly all cases.

In general, a problem associated with the bootstrapping technique described above is that the best found solution to a particular geometry might suffer one thousand times (1000×) worse error than that of a nearby geometry (e.g., relative to exact eigensolution) because the bootstrapped parameters from the nearest geometry do not fall inside the "basin of attraction" of the error surface, or the neighborhood in parameter space, such that any point in that region will eventually be iterated toward a point with the desired degree of error. In non-classically-verifiable quantum computers, the above described problem associated with the bootstrapping technique is a substantial challenge. With the progress made by quantum computers, one might soon become unable to verify classically whether the solution given by a variational algorithm dependably converged to a high-accuracy solution, thereby casting doubt on all solutions, even luckily high-accuracy ones, and making the entire algorithm undependable for practical purposes. Therefore, an improvement of the dependability of these algorithms is needed.

As an example, in classical quantum chemistry methods, extrapolation of the wavefunction as a starting point to self-consistent field methods is a longstanding method to improve convergence and computation time. However, note that in the classical quantum chemistry approaches, the wavefunction itself is being extrapolated, whereas in bootstrapping, the quantum computing approach, it is the rotational parameters of a quantum variational circuit that are reused.

Although multiple embodiments are described herein with reference to the chemistry domain, it should be appreciated that the subject disclosure is not so limited. For example, any of the embodiments described herein can be implemented in various domains including, but not limited to, artificial intelligence, optimization, and/or another domain.

FIG. 1 illustrates a block diagram of an example, non-limiting system 100 that can facilitate parameter set optimization based on system parameter extrapolation in accordance with one or more embodiments described herein. According to several embodiments, system 100 can comprise a parameter extrapolation system 102. In some embodiments, parameter extrapolation system 102 can comprise a memory 104, a processor 106, an extrapolation component 108, a variational component 110, and/or a bus 112.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or parameter extrapolation system 102 can further comprise various computer and/or computing-based elements described herein with reference to operating environment 1000 and FIG. 10. In several embodiments, such computer and/or computing-based elements can be used in connection with implementing one or more of the systems, devices, components, and/or computer-implemented operations shown and described in connection with FIG. 1 or other figures disclosed herein.

According to multiple embodiments, memory 104 can store one or more computer and/or machine readable, writable, and/or executable components and/or instructions that, when executed by processor 106, can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to parameter extrapolation system 102, extrapolation component 108, variational component 110, and/or another component associated with system 100 and/or parameter extrapolation system 102, as described herein with or without reference to the various figures of the subject disclosure.

In some embodiments, memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 1016 and FIG. 10. Such examples of memory 104 can be employed to implement any embodiments of the subject disclosure.

According to multiple embodiments, processor 106 can comprise one or more types of processors and/or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, and/or another type of processor. Further examples of processor 106 are described below with reference to processing unit 1014 and FIG. 10. Such examples of processor 106 can be employed to implement any embodiments of the subject disclosure.

In some embodiments, parameter extrapolation system 102, memory 104, processor 106, extrapolation component 108, variational component 110, and/or another component of parameter extrapolation system 102 as described herein can be communicatively, electrically, and/or operatively coupled to one another via a bus 112 to perform functions of system 100, parameter extrapolation system 102, and/or any components coupled therewith. In several embodiments, bus 112 can comprise one or more memory bus, memory controller, peripheral bus, external bus, local bus, and/or another type of bus that can employ various bus architectures. Further examples of bus 112 are described below with reference to system bus 1018 and FIG. 10. Such examples of bus 112 can be employed to implement any embodiments of the subject disclosure.

In some embodiments, parameter extrapolation system 102 can comprise any type of component, machine, device, facility, apparatus, and/or instrument that comprises a processor and/or can be capable of effective and/or operative communication with a wired and/or wireless network. All such embodiments are envisioned. For example, parameter extrapolation system 102 can comprise a server device, a computing device, a general-purpose computer, a special-purpose computer, a quantum computing device (e.g., a quantum computer, a quantum processor, etc.), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

In some embodiments, parameter extrapolation system 102 can be coupled (e.g., communicatively, electrically, operatively, etc.) to one or more external systems, sources, and/or devices (e.g., computing devices, communication devices, etc.) via a data cable (e.g., coaxial cable, High-Definition Multimedia Interface (HDMI), recommended standard (RS) 232, Ethernet cable, etc.). In some embodiments, parameter extrapolation system 102 can be coupled (e.g., communicatively, electrically, operatively, etc.) to one or more external systems, sources, and/or devices (e.g., computing devices, communication devices, etc.) via a network.

According to multiple embodiments, such a network can comprise wired and wireless networks, including, but not limited to, a cellular network, a wide area network (WAN) (e.g., the Internet) or a local area network (LAN). For example, parameter extrapolation system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802. XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, parameter extrapolation system 102 can thus include hardware (e.g., a central processing unit (CPU), a transceiver, a decoder), software (e.g., a set of threads, a set of processes, software in execution) or a combination of hardware and software that facilitates communicating information between parameter extrapolation system 102 and external systems, sources, and/or devices (e.g., computing devices, communication devices, etc.).

According to multiple embodiments, parameter extrapolation system 102 can comprise one or more computer and/or machine readable, writable, and/or executable components and/or instructions that, when executed by processor 106, can facilitate performance of operations defined by such component(s) and/or instruction(s). Further, in numerous embodiments, any component associated with parameter extrapolation system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, extrapolation component 108, variational component 110, and/or any other components associated with parameter extrapolation system 102 as disclosed herein (e.g., communicatively, electronically, and/or operatively coupled with and/or employed by parameter extrapolation system 102), can comprise such computer and/or machine readable, writable, and/or executable component(s) and/or instruction(s). Consequently, according to numerous embodiments, parameter extrapolation system 102 and/or any components associated therewith as disclosed herein, can employ processor 106 to execute such computer and/or machine readable, writable, and/or executable component(s) and/or instruction(s) to facilitate performance of one or more operations described herein with reference to parameter extrapolation system 102 and/or any such components associated therewith.

In some embodiments, parameter extrapolation system 102 can facilitate performance of operations executed by and/or associated with extrapolation component 108, variational component 110, and/or another component associated with parameter extrapolation system 102 as disclosed herein. For example, as described in detail below, parameter extrapolation system 102 can facilitate: extrapolating a system parameter of a parameter set to determine a starting parameter value of a variational circuit; and/or determining a system parameter value of the parameter set based on the starting parameter value. In some embodiments, parameter extrapolation system 102 can further facilitate: extrapolating a rotational parameter of a molecular geometry parameter set to determine a starting parameter value of a variational circuit; and/or determining a rotational parameter value of the molecular geometry parameter set based on the starting parameter value. In some embodiments, parameter extrapolation system 102 can further facilitate: extrapolating multiple system parameters of multiple parameter sets to determine the starting parameter value, thereby facilitating at least one of reduced evaluation of the parameter set or improved processing performance of the processor; employing at least one of a Lagrangian polynomial, a differential model, a Hamiltonian evolution, a best fit model, or a greedy fit by parameter model to extrapolate one or more system parameters of one or more parameter sets; employing an optimization function, a variational circuit, a quantum variational circuit, a parameterized quantum circuit, a variational algorithm, a quantum variational algorithm, or a variational quantum eigensolver algorithm to determine the system parameter based on a randomly selected starting parameter value; and/or computing a minimum value or a maximum value of a cost function. In some embodiments, parameter extrapolation system 102 can further facilitate: extrapolating multiple rotational parameters of multiple molecular geometry parameter sets to determine the starting parameter value; and/or employing at least one of a Lagrangian polynomial, a differential model, a Hamiltonian evolution, a best fit model, or a greedy fit by parameter model to extrapolate one or more rotational parameters of one or more molecular geometry parameter sets.

According to multiple embodiments, extrapolation component 108 can extrapolate a system parameter of a parameter set to determine a starting parameter value of a variational circuit. For example, to determine a starting parameter value of a variational circuit, extrapolation component 108 can extrapolate a system parameter including, but not limited to, a minimum value, a maximum value, and/or another system parameter of a parameter set. For instance, to determine a starting parameter value of a variational circuit, extrapolation component 108 can extrapolate a system parameter (e.g., a minimum value, a maximum value, etc.) of a parameter set including, but not limited to, a quantum parameter set, a cost function (e.g., a classical cost function), a Hamiltonian operator, and/or another parameter set. In some embodiments, to facilitate extrapolating a system parameter of a parameter set, extrapolation component 108 can comprise and/or employ one or more extrapolation techniques including, but not limited to, a Lagrangian polynomial, a differential model, a Hamiltonian evolution, a best fit model, a greedy fit by parameter model, and/or another extrapolation technique.

In some embodiments, to facilitate extrapolating a system parameter of a parameter set, extrapolation component 108 can comprise and/or employ a Lagrangian polynomial. In these embodiments, for each variational parameter, extrapolation component 108 can use least-squares iteration to find a polynomial function of the interatomic distance (or other metric representing the subproblems) of user-selected degree m. In these embodiments, mathematically, extrapolation component 108 can determine a matrix A, such that extrapolation component 108 can compute each new parameter $b_j$ (j from 0→n parameters) using $b_j = \text{sum}(A_{jk} * x^k)$ k from 0→m, minimizing the mean squared error of these parameters over the existing parameter sets, where x is the domain of the polynomial function and $b_j$ is the rotational parameter at index j of the circuit for the problem defined by x. For example, extrapolation component 108 can determine a list of coefficients for each parameter that optimally fits that parameter to a polynomial function of the interatomic distance. In some embodiments, extrapolation component 108 can further use the polynomial function for each parameter to compute the starting parameter value at a next desired interatomic distance (as referenced herein, interatomic distance can describe a molecular geometry, geometry of a molecule). In some embodiments, extrapolation component 108 can perform such extrapolation using the Lagrangian polynomial method described above where the degree of the polynomial desired and/or the quantity of neighboring points to consider (e.g., maximum or minimum system parameter values of other parameter sets) can be defined by an entity. For example, in some embodiments, parameter extrapolation system 102 can comprise an interface component such as, for instance, a graphical user interface (GUI) that can enable an entity (e.g., a human) to input such data into parameter extrapolation system 102 and/or extrapolation component 108.

Figure 4:
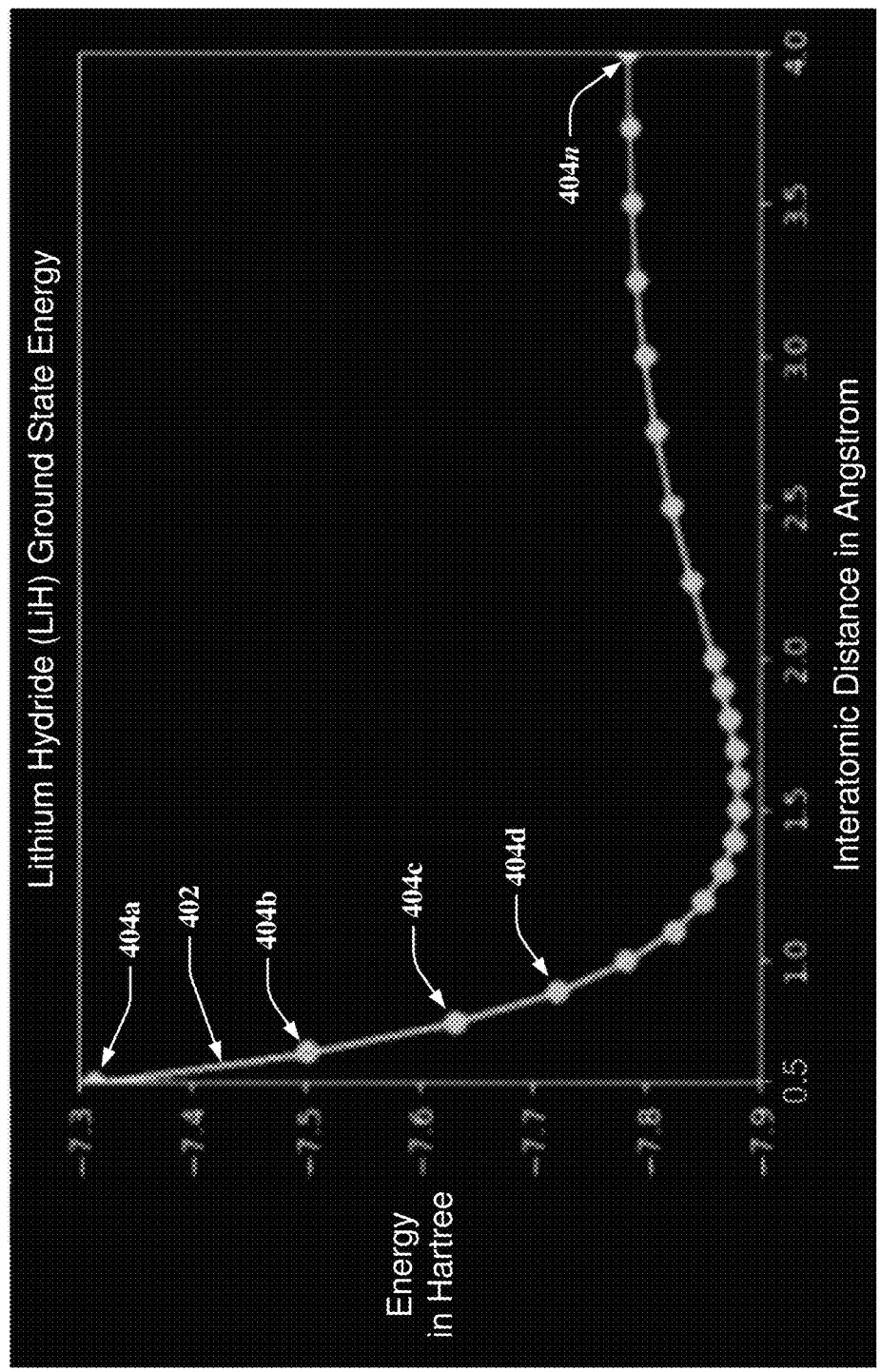
FIG. 4 illustrates an example, non-limiting plot that can facilitate parameter set optimization based on system parameter extrapolation in accordance with one or more embodiments described herein.
Figure 5:
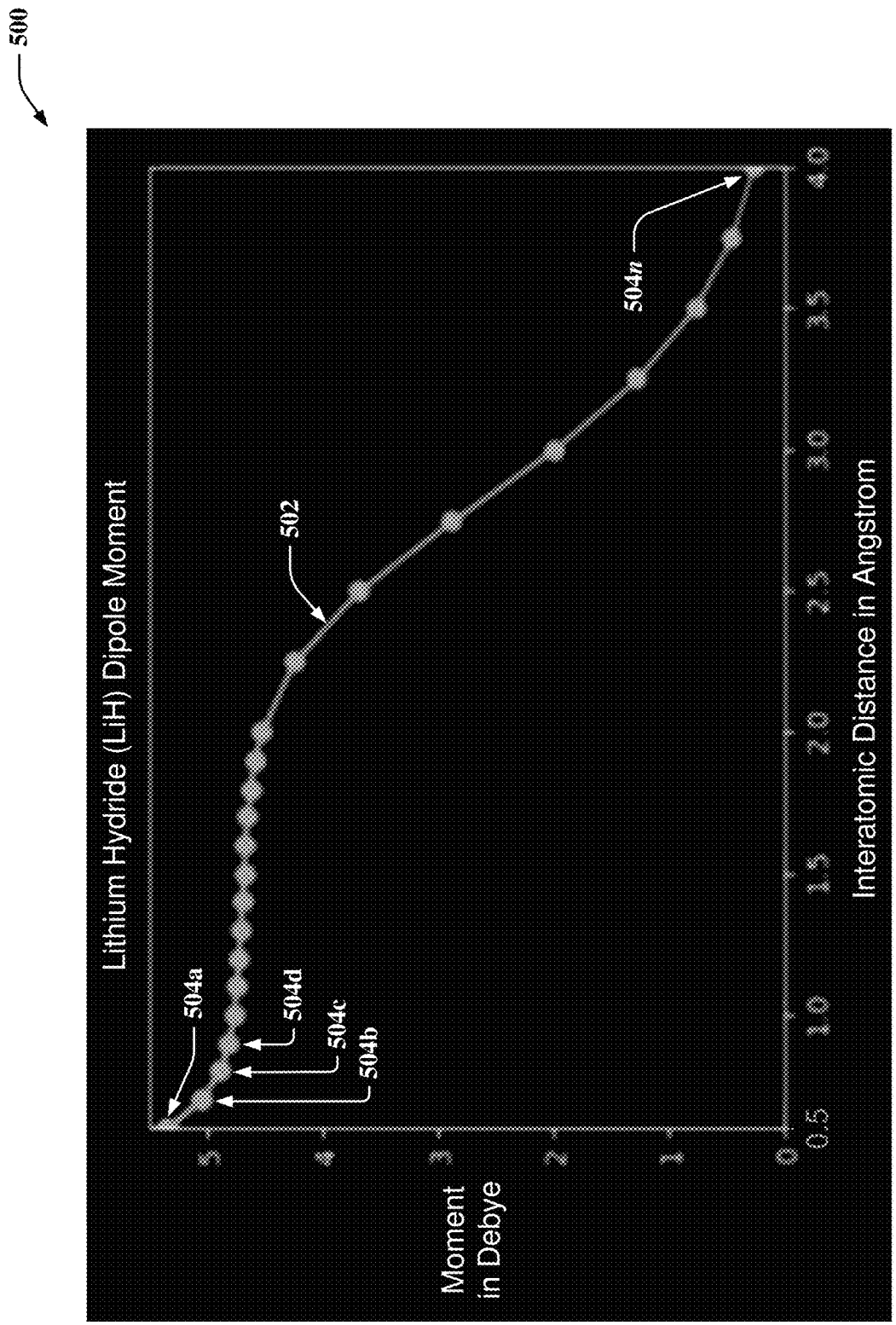
FIG. 5 illustrates an example, non-limiting plot that can facilitate parameter set optimization based on system parameter extrapolation in accordance with one or more embodiments described herein.

In some embodiments, to facilitate extrapolating a system parameter of a parameter set, extrapolation component 108 can comprise and/or employ a differential model and/or a Hamiltonian evolution. In these embodiments, extrapolation component 108 can take each prior optimal parameter set as a point in a vector space of dimension n, where n can denote the number of parameters. In these embodiments, extrapolation component 108 can further compute numerical gradients over each parameter in such a vector space for each point, up to a defined degree of differentiation m, which can be defined by an entity (e.g., a human) as described above (e.g., via a GUI). In these embodiments, extrapolation component 108 can further take each parameter list and a corresponding list of numerical gradients as a single point in a new larger vector space. In these embodiments, extrapolation component 108 can further determine (e.g., via least-squares reduction) a matrix which represents a Hamiltonian evolving each point to its subsequent point by a time-step of the size represented by the interatomic distance difference between the geometries. Additionally, or alternatively, in these embodiments, extrapolation component 108 can, for simplicity, simply use the same matrix for all neighboring points, independent of the distance difference. In some embodiments, with three interatomic distances (e.g., points at 1.0 Angstrom (Å), 1.1 Å, and 1.2 Å, as illustrated in FIGS. 4 and 5), extrapolation component 108 can fit a matrix which when multiplied by parameters and numerical gradients of a first the three interatomic distances (e.g., the point at 1.0 Å illustrated in FIGS. 4 and 5), can result in parameters and numerical gradients of a second interatomic distance (e.g., the point at 1.1 Å illustrated in FIGS. 4 and 5), and when multiplied by such parameters and numerical gradients of such second interatomic distance, can result in parameters and numerical gradients of a third interatomic distance (e.g., the point at 1.2 Å illustrated in FIGS. 4 and 5), with the least possible error. In these embodiments, if a fourth interatomic distance is introduced (e.g., the point at 1.4 Å illustrated in FIGS. 4 and 5), extrapolation component 108 can apply the $\text{matrix}^2$ instead to fit the third interatomic distance to the fourth interatomic distance (e.g., the points at 1.2 Å to 1.4 Å illustrated in FIGS. 4 and 5), as the distance between them is twice the distance between the first interatomic distance and the second interatomic distance (e.g., the points at 1.0 Å and 1.1 Å illustrated in FIGS. 4 and 5) or the second interatomic distance and the third interatomic distance (e.g., the points at 1.1 Å and 1.2 Å illustrated in FIGS. 4 and 5), which is consistent with Hamiltonian evolution.

In some embodiments, extrapolation component 108 can perform such extrapolation using the differential model and/or a Hamiltonian evolution method described above where the degree of the differentiation desired and/or the quantity of neighboring points to consider (e.g., maximum or minimum system parameter values of other parameter sets) can be defined by an entity (e.g., via a GUI as described above). In some embodiments, by using the differential model and/or a Hamiltonian evolution method as described above, parameter extrapolation system 102 and/or extrapolation component 108 can thereby facilitate reduced quantity of evaluations that must be performed over, for instance, a full dissociation curve when compared to existing techniques (e.g., bootstrapping or no extrapolation).

In some embodiments, to facilitate extrapolating a system parameter of a parameter set, extrapolation component 108 can comprise and/or employ a best fit model. In these embodiments, extrapolation component 108 can analyze multiple extrapolation methods (e.g., multiple degrees and/or lookback windows for the extrapolation methods described above such as, for instance, Lagrangian polynomial, differential model, Hamiltonian evolution, etc.), and extrapolation component 108 can select the method with the best least-squares fit over the lookback window, best overall closeness to the energy result from the nearest neighbor energy solution, and/or several other measures of parameter set quality. In some embodiments, an entity (e.g., a human) can specify (e.g., via a GUI as described above) one or more extrapolation methods (e.g., multiple degrees and/or lookback windows for the extrapolation methods described above such as, for instance, Lagrangian polynomial, differential model, Hamiltonian evolution, etc.), and extrapolation component 108 can select the method with the best least-squares fit over the lookback window, best overall closeness to the energy result from the nearest neighbor energy solution, and/or several other measures of parameter set quality.

In some embodiments, to facilitate extrapolating a system parameter of a parameter set, extrapolation component 108 can comprise and/or employ a greedy fit by parameter model. In some embodiments, the greedy fit by parameter model can be similar to the best fit model described above, but the greedy fit by parameter model can select one or more distinct extrapolation methods for each distinct parameter for each point. In some embodiments, some parameters can be more amenable to one form of extrapolation over another across, for instance, a dissociation curve, and extrapolation component 108 can select the correct extrapolation method based on prior fit.

In some embodiments, extrapolation component 108 can extrapolate multiple system parameters of multiple parameter sets to determine a starting parameter value of a variational circuit. For example, to facilitate extrapolating multiple system parameters (e.g., minimum values, maximum values, etc.) of multiple parameter sets (e.g., quantum parameter sets, classical cost functions, Hamiltonian operators, etc.) to determine a starting parameter value of a variational circuit, extrapolation component 108 can employ one or more of the parameter extrapolation techniques described above (e.g., Lagrangian polynomial, differential model, Hamiltonian evolution, best fit model, greedy fit by parameter model, etc.).

In some embodiments, extrapolation component 108 can extrapolate multiple system parameters of one or more defined parameter sets to determine a starting parameter value of a variational circuit. For example, to facilitate extrapolating multiple system parameters (e.g., minimum values, maximum values, etc.) of one or more defined parameter sets (e.g., defined by an entity such as, a human, via a GUI as described above) to determine a starting parameter value of a variational circuit, extrapolation component 108 can employ one or more of the parameter extrapolation techniques described above (e.g., Lagrangian polynomial, differential model, Hamiltonian evolution, best fit model, greedy fit by parameter model, etc.).

According to multiple embodiments, variational component 110 can determine a system parameter value of a parameter set based on a starting parameter value of a variational circuit. For example, variational component 110 can determine a system parameter value of a parameter set based on a starting parameter value of a variational circuit that can be determined by extrapolation component 108 as described above. In some embodiments, variational component 110 can compute a system parameter value such as, for instance, a minimum value or a maximum value of a cost function (e.g., a classical cost function) based on a starting parameter value of a variational circuit that can be determined by extrapolation component 108 as described above.

In some embodiments, to determine a system parameter value of a parameter set based on a starting parameter value, variational component 110 can comprise and/or employ a variational component including, but not limited to, an optimization function, a variational circuit, a quantum variational circuit, a parameterized quantum circuit, a variational algorithm, a quantum variational algorithm, a variational quantum eigensolver (VQE) algorithm, and/or another variational component. For example, in embodiments implemented in the chemistry domain, variational component 110 can comprise and/or employ a VQE algorithm that can determine a rotational parameter value (e.g., a maximum or minimum rotational parameter value) of a molecular geometry parameter set based on one or more previously determined rotational parameter values (e.g., maximum or minimum rotational parameter values) corresponding to one or more parameter sets. In this example, such one or more previously determined rotational parameter values can be computed (e.g., via a VQE algorithm) by second variational component 202 as described below with reference to FIG. 2.

Figure 2:
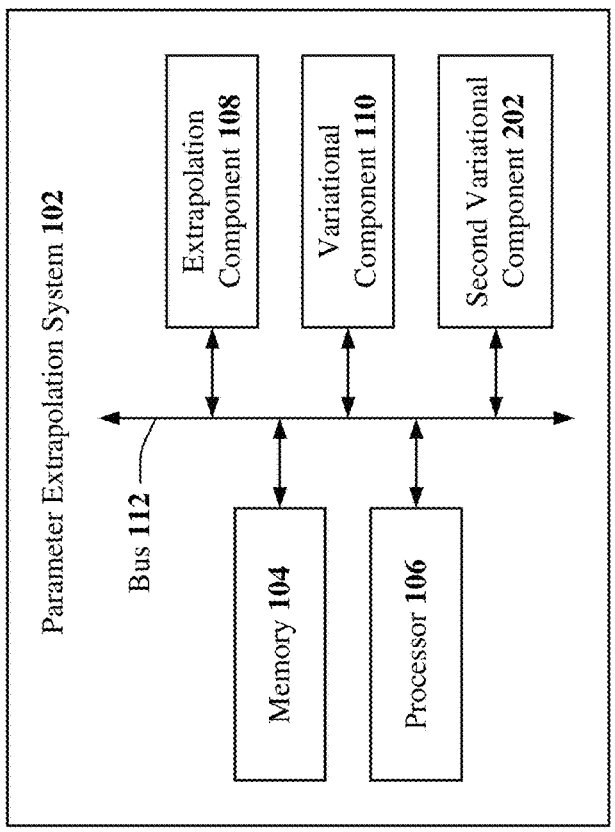
FIG. 2 illustrates a block diagram of an example, non-limiting system that can facilitate parameter set optimization based on system parameter extrapolation in accordance with one or more embodiments described herein.

FIG. 2 illustrates a block diagram of an example, non-limiting system 200 that can facilitate parameter set optimization based on system parameter extrapolation in accordance with one or more embodiments described herein. Repetitive description of like elements and/or processes employed in respective embodiments is omitted for sake of brevity. In some embodiments, system 200 can comprise parameter extrapolation system 102, which can comprise a second variational component 202.

According to multiple embodiments, second variational component 202 can comprise variational component 110. In some embodiments, second variational component 202 can determine a value of a system parameter based on a randomly selected starting parameter value of a variational circuit. For example, in embodiments implemented in the chemistry domain, second variational component 202 can determine a rotational parameter value (e.g., maximum or minimum rotational parameter value) of a molecular geometry parameter set (e.g., as described below) based on a randomly selected starting parameter value of a VQE algorithm, where parameter extrapolation system 102 and/or variational component 110 can facilitate such selection of such a randomly selected starting parameter value.

In some embodiments, to determine a value of a system parameter based on a randomly selected starting parameter value, second variational component 202 can comprise and/or employ a variational component including, but not limited to, an optimization function, a variational circuit, a quantum variational circuit, a parameterized quantum circuit, a variational algorithm, a quantum variational algorithm, a variational quantum eigensolver (VQE) algorithm, and/or another variational component. For example, in embodiments implemented in the chemistry domain, second variational component 202 can comprise and/or employ a VQE algorithm that can determine a value of a rotational parameter (e.g., a maximum or minimum value of a rotational parameter) of a molecular geometry parameter set based on a randomly selected starting parameter value that can be selected by parameter extrapolation system 102 and/or second variational component 202.

In some embodiments, for example, embodiments implemented in the chemistry domain, variational component 110 and/or second variational component 202 can execute a variational algorithm (e.g., a VQE algorithm) to determine one or more points on a dissociation curve (e.g., points 404a, 404b, 404c, 404d, 404n of dissociation curve 402 described below and illustrated in FIG. 4) and/or some other set of closely related Hamiltonians. In these embodiments, such one or more points on a dissociation curve can correspond to one or more rotational parameter values (e.g., maximum or minimum rotational parameter values) of one or more molecular geometry parameter sets.

In some embodiments, for example, embodiments implemented in the chemistry domain, based on determination (e.g., by variational component 110 and/or second variational component 202) of one or more of such points on a dissociation curve, extrapolation component 108 can extrapolate one or more starting parameter sets (e.g., starting rotational parameter values) of one or more VQE algorithm executions (e.g., by variational component 110) of subsequent points from the optimal parameter sets of solved nearby points (e.g., where optimal can comprise parameter sets within defined error bounds). For example, in embodiments implemented in the chemistry domain, an entity can employ parameter extrapolation system 102 (e.g., via extrapolation component 108, variational component 110, second variational component 202, etc.) to perform a ground state energy calculation for the dissociation of nitrogen ($N_2$), beginning with the two nitrogen atoms at 1.0 angstroms (Å) apart. In this example, based on second variational component 202 solving (e.g., via a VQE algorithm and one or more randomly selected starting parameter values) that point (e.g., the point at 1.0 Å), variational component 110 can compute the point at 1.1 Å based on starting parameter value(s) that can be computed by extrapolation component 108 (e.g., as described above with reference to FIG. 1). In another example, the results (e.g., the maximum or minimum value of a parameter set) from the points at 1.0 Å and 1.1 Å can be extrapolated by extrapolation component 108 to determine the starting parameter value(s) that can be used by variational component 110 to solve the point at 1.2 Å. In this example, the results (e.g., the maximum or minimum value of a parameter set) from the points at 1.0 Å, 1.1 Å, and 1.2 Å can be extrapolated by extrapolation component 108 to determine the starting parameter value(s) that can be used by variational component 110 to solve the point at 1.3 Å. In some embodiments, parameter extrapolation system 102 (e.g., via extrapolation component 108, variational component 110, and second variational component 202) can repeat such a process as needed to solve one or more additional points of a dissociation curve. In some embodiments, extrapolation component 108 can discard all but n closest points, where n, for example, can be defined by an entity (e.g., defined by a human using a GUI of parameter extrapolation system 102 as described above with reference to FIG. 1).

In some embodiments, parameter extrapolation system 102 can be associated with various technologies. For example, parameter extrapolation system 102 can be associated with classical computing technologies, quantum computing technologies, variational technologies, variational circuit technologies, optimization technologies, parameter extraction technologies, quantum computer programming technologies, and/or other technologies.

In some embodiments, parameter extrapolation system 102 can provide technical improvements to systems, devices, components, operational steps, and/or processing steps associated with the various technologies identified above. For example, parameter extrapolation system 102 can extrapolate (e.g., via extrapolation component 108) over system parameters (e.g., rotational parameters) that are nonlinear and difficult to analyze analytically. Conversely, existing parameter extrapolation systems and/or methods in the chemistry domain, for example, extrapolate over the wavefunction, and nearly all such existing parameter extrapolation systems and/or methods rely on some form of proven behavior in the underlying wavefunction. In another example, parameter extrapolation system 102 can further facilitate improvements over the bootstrapping technique, as bootstrapping does not perform extrapolation, rather it takes the nearest neighbor point as is. In another example, parameter extrapolation system 102 can also facilitate improvements over existing parameter extrapolation systems and/or methods as parameter extrapolation system 102 (e.g., via extrapolation component 108) can attempt to fit the system parameters (e.g., rotational parameters) to an extrapolation function, which is a highly complex task in a high-dimensional space.

In some embodiments, parameter extrapolation system 102 can facilitate further improvements over existing parameter extrapolation systems and/or methods by reducing the number of evaluations needed by a variational circuit and/or variational algorithm to determine a system parameter. For example, parameter extrapolation system 102 can reduce the time a variational circuit and/or a variational algorithm takes to converge to a maximum or a minimum value of a parameter set (e.g., the time a variational algorithm such as, for instance, a variational quantum eigensolver (VQE) takes to determine a maximum or a minimum value of a parameter set). For instance, instead of using one or more randomly selected starting parameter values or a single previous system parameter value, parameter extrapolation system 102 (e.g., via extrapolation component 108) can extrapolate one or more previously computed system parameters (e.g., maximum or minimum rotational parameters) to determine one or more starting parameter values of one or more subsequent parameter sets (e.g., new molecular geometries).

In some embodiments, parameter extrapolation system 102 can provide technical improvements to a processing unit (e.g., processor 106) associated with a classical computing device and/or a quantum computing device (e.g., a quantum processor, quantum hardware etc.). For example, by reducing the quantity of evaluations a variational circuit and/or a variational algorithm performs to converge to a maximum or a minimum value of a parameter set, parameter extrapolation system 102 can reduce processing time and/or processing workload of such a processing unit (e.g., processor 106), thereby facilitating improved processing performance of such a processing unit.

In some embodiments, parameter extrapolation system 102 can employ hardware or software to solve problems that are highly technical in nature, that are not abstract and that cannot be performed as a set of mental acts by a human In some embodiments, some of the processes described herein may be performed by one or more specialized computers (e.g., one or more specialized processing units, a specialized quantum computer, etc.) for carrying out defined tasks related to the various technologies identified above. In some embodiments, parameter extrapolation system 102 or components thereof, can be employed to solve new problems that arise through advancements in technologies mentioned above, employment of quantum computing systems, cloud computing systems, computer architecture, and/or another technology.

It is to be appreciated that parameter extrapolation system 102 can utilize various combinations of electrical components, mechanical components, and circuitry that cannot be replicated in the mind of a human or performed by a human, as the various operations that can be executed by parameter extrapolation system 102 or components thereof as described herein are operations that are greater than the capability of a human mind. For instance, the amount of data processed, the speed of processing such data, or the types of data processed by parameter extrapolation system 102 over a certain period of time can be greater, faster, or different than the amount, speed, or data type that can be processed by a human mind over the same period of time.

According to several embodiments, parameter extrapolation system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that parameter extrapolation system 102 can include information that is impossible to obtain manually by an entity, such as a human user. For example, the type, amount, or variety of information included in parameter extrapolation system 102, extrapolation component 108, variational component 110, and/or second variational component 202 can be more complex than information obtained manually by a human user.

FIG. 3 illustrates an example, non-limiting script 300 that can facilitate parameter set optimization based on system parameter extrapolation in accordance with one or more embodiments described herein. Repetitive description of like elements and/or processes employed in respective embodiments is omitted for sake of brevity.

In some embodiments, parameter extrapolation system 102 can comprise and/or employ script 300, which can be executed by a processing unit associated with parameter extrapolation system 102 (e.g., processor 106, a quantum processor, etc.). In some embodiments, for example, embodiments implemented in the chemistry domain, parameter extrapolation system 102 can execute script 300 (e.g., via processor 106, extrapolation component 108, variational component 110, and/or second variational component 202) to generate a dissociation curve. For example, parameter extrapolation system 102 can execute script 300 (e.g., via processor 106, extrapolation component 108, variational component 110, and/or second variational component 202) to generate a dissociation curve such as, for instance, dissociation curve 402 and/or dissociation curve 502 described below and illustrated in FIGS. 4 and 5, respectively.

FIG. 4 illustrates an example, non-limiting plot 400 that can facilitate parameter set optimization based on system parameter extrapolation in accordance with one or more embodiments described herein. Repetitive description of like elements and/or processes employed in respective embodiments is omitted for sake of brevity.

According to multiple embodiments, plot 400 can comprise a dissociation curve 402. In some embodiments, dissociation curve 402 can comprise a dissociation curve representing ground state energy of lithium hydride (LiH). In some embodiments, the X-axis of plot 400 can represent interatomic distance (e.g., molecular geometry) measured in angstroms (Å) and/or the Y-axis of plot 400 can represent energy measured in Hartree. In some embodiments, dissociation curve 402 can comprise points 404a, 404b, 404c, 404d, 404n (where n represents a total quantity of points). In some embodiments, points 404a, 404b, 404c, 404d, 404n can comprise system parameter values (e.g., maximum or minimum rotational parameter values) of parameter sets (e.g., molecular geometry parameter sets).

In some embodiments, for example, embodiments implemented in the chemistry domain, parameter extrapolation system 102 can generate dissociation curve 402 and/or points 404a, 404b, 404c, 404d, 404n by employing processor 106, extrapolation component 108, variational component 110, second variational component 202, and/or script 300 (e.g., as described above with reference to FIGS. 1, 2, and 3). For instance, parameter extrapolation system 102 can employ second variational component 202 to determine (e.g., via a VQE algorithm) point 404a based on a randomly selected starting parameter value (e.g., as described above with reference to FIG. 2), where point 404a can comprise a maximum or minimum rotational parameter value of the molecular geometry parameter set corresponding to the interatomic distance of 0.5 Å (e.g., as illustrated in FIG. 4).

In the above described example, based on such computation of point 404a (e.g., via second variational component 202), extrapolation component 108 can extrapolate point 404a (e.g., extrapolate the rotational parameter value of point 404a) to determine a starting parameter value (e.g., a starting rotational parameter value) that can be used by variational component 110 to determine (e.g., via a VQE algorithm) the rotational parameter value of point 404b. In this example, based on such computation of point 404a and/or point 404b (e.g., via variational component 110), extrapolation component 108 can extrapolate point 404a and/or point 404b (e.g., extrapolate the rotational parameter value of point 404a and/or point 404b) to determine a starting parameter value (e.g., a starting rotational parameter value) that can be used by variational component 110 to determine (e.g., via a VQE algorithm) the rotational parameter value of point 404c. In this example, based on such computation of point 404a, point 404b, and/or point 404c (e.g., via variational component 110 and/or second variational component 202), extrapolation component 108 can extrapolate point 404a, point 404b, and/or point 404c (e.g., extrapolate the rotational parameter value of point 404a, point 404b, and/or point 404c) to determine a starting parameter value (e.g., a starting rotational parameter value) that can be used by variational component 110 to determine (e.g., via a VQE algorithm) the rotational parameter value of point 404d. In this example, parameter extrapolation system 102 can repeat the process steps described above to determine all points of dissociation curve 402, ending with point 404n.

FIG. 5 illustrates an example, non-limiting plot 500 that can facilitate parameter set optimization based on system parameter extrapolation in accordance with one or more embodiments described herein. Repetitive description of like elements and/or processes employed in respective embodiments is omitted for sake of brevity.

According to multiple embodiments, plot 500 can comprise an example, non-limiting alternative embodiment of plot 400, where plot 500 can comprise a dissociation curve 502. In some embodiments, dissociation curve 502 can comprise an example, non-limiting alternative embodiment of dissociation curve 402, where dissociation curve 502 can comprise a dissociation curve representing dipole moment of lithium hydride (LiH). In some embodiments, the X-axis of plot 500 can represent interatomic distance (e.g., molecular geometry) measured in angstroms (Å) and/or the Y-axis of plot 500 can represent moment measured in Debye. In some embodiments, dissociation curve 502 can comprise points 504a, 504b, 504c, 504d, 504n (where n represents a total quantity of points). In some embodiments, points 504a, 504b, 504c, 504d, 504n can comprise system parameter values (e.g., maximum or minimum rotational parameter values) of parameter sets (e.g., molecular geometry parameter sets).

In some embodiments, for example, embodiments implemented in the chemistry domain, parameter extrapolation system 102 can generate dissociation curve 502 and/or points 504a, 504b, 504c, 504d, 504n by employing processor 106, extrapolation component 108, variational component 110, second variational component 202, and/or script 300 (e.g., as described above with reference to FIGS. 1, 2, and 3). For instance, parameter extrapolation system 102 can employ second variational component 202 to determine (e.g., via a VQE algorithm) point 504a based on a randomly selected starting parameter value (e.g., as described above with reference to FIG. 2), where point 504a can comprise a maximum or minimum rotational parameter value of the molecular geometry parameter set corresponding to the interatomic distance of 0.5 Å (e.g., as illustrated in FIG. 5).

In the above described example, based on such computation of point 504a (e.g., via second variational component 202), extrapolation component 108 can extrapolate point 504a (e.g., extrapolate the rotational parameter value of point 504a) to determine a starting parameter value (e.g., a starting rotational parameter value) that can be used by variational component 110 to determine (e.g., via a VQE algorithm) the rotational parameter value of point 504b. In this example, based on such computation of point 504a and/or point 504b (e.g., via variational component 110), extrapolation component 108 can extrapolate point 504a and/or point 504b (e.g., extrapolate the rotational parameter value of point 504a and/or point 504b) to determine a starting parameter value (e.g., a starting rotational parameter value) that can be used by variational component 110 to determine (e.g., via a VQE algorithm) the rotational parameter value of point 504c. In this example, based on such computation of point 504a, point 504b, and/or point 504c (e.g., via variational component 110 and/or second variational component 202), extrapolation component 108 can extrapolate point 504a, point 504b, and/or point 504c (e.g., extrapolate the rotational parameter value of point 504a, point 504b, and/or point 504c) to determine a starting parameter value (e.g., a starting rotational parameter value) that can be used by variational component 110 to determine (e.g., via a VQE algorithm) the rotational parameter value of point 504d. In this example, parameter extrapolation system 102 can repeat the process steps described above to determine all points of dissociation curve 502, ending with point 504n.

Figure 6:
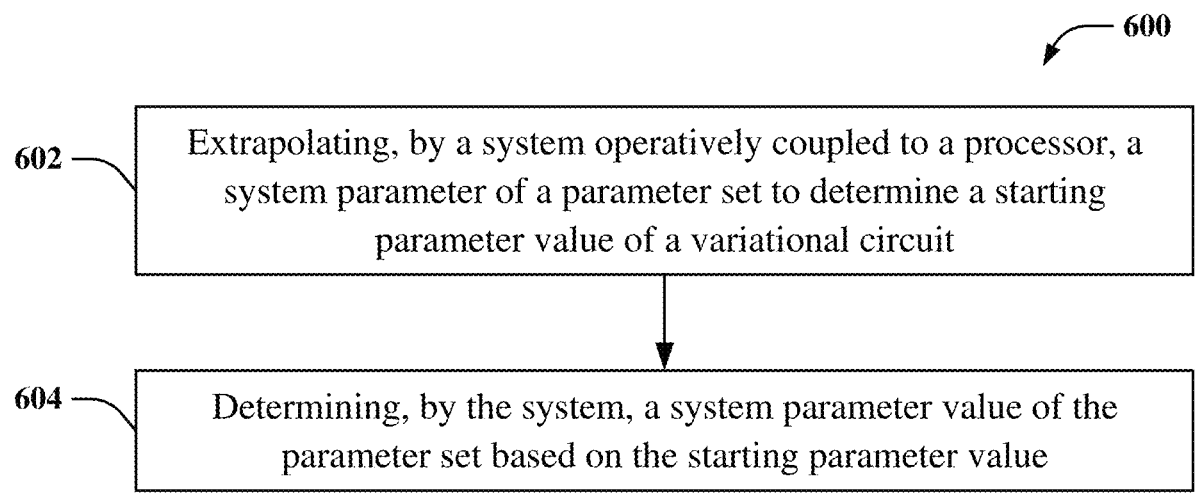
FIG. 6 illustrates a flow diagram of an example, non-limiting computer-implemented method that can facilitate parameter set optimization based on system parameter extrapolation in accordance with one or more embodiments described herein.

FIG. 6 illustrates a flow diagram of an example, non-limiting computer-implemented method 600 that can facilitate parameter set optimization based on system parameter extrapolation in accordance with one or more embodiments described herein. Repetitive description of like elements and/or processes employed in respective embodiments is omitted for sake of brevity.

In some embodiments, at 602, computer-implemented method 600 can comprise extrapolating, by a system (e.g., via parameter extrapolation system 102 and/or extrapolation component 108) operatively coupled to a processor (e.g., processor 106), a system parameter (e.g., maximum or minimum parameter value) of a parameter set (e.g., a cost function) to determine a starting parameter value of a variational circuit (e.g., a VQE algorithm).

In some embodiments, at 604, computer-implemented method 600 can comprise determining, by the system (e.g., via parameter extrapolation system 102 and/or variational component 110), a system parameter value (e.g., a maximum or minimum parameter value) of the parameter set based on the starting parameter value.

Figure 7:
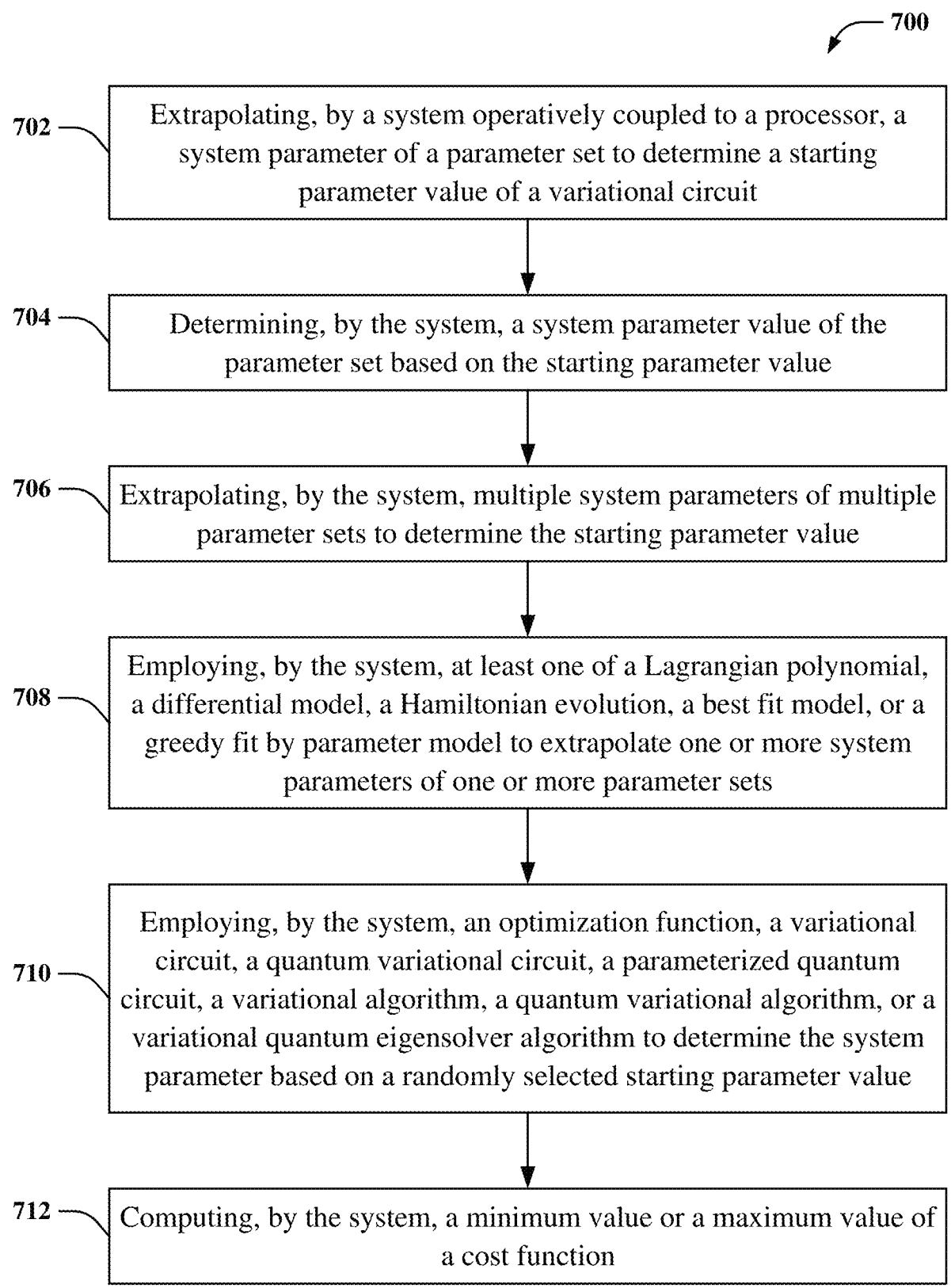
FIG. 7 illustrates a flow diagram of an example, non-limiting computer-implemented method that can facilitate parameter set optimization based on system parameter extrapolation in accordance with one or more embodiments described herein.

FIG. 7 illustrates a flow diagram of an example, non-limiting computer-implemented method 700 that can facilitate parameter set optimization based on system parameter extrapolation in accordance with one or more embodiments described herein. Repetitive description of like elements and/or processes employed in respective embodiments is omitted for sake of brevity.

In some embodiments, at 702, computer-implemented method 700 can comprise extrapolating, by a system (e.g., via parameter extrapolation system 102 and/or extrapolation component 108) operatively coupled to a processor (e.g., processor 106), a system parameter (e.g., maximum or minimum parameter value) of a parameter set (e.g., a cost function) to determine a starting parameter value of a variational circuit (e.g., a VQE algorithm).

In some embodiments, at 704, computer-implemented method 700 can comprise determining, by the system (e.g., via parameter extrapolation system 102 and/or variational component 110), a system parameter value (e.g., a maximum or minimum parameter value) of the parameter set based on the starting parameter value.

In some embodiments, at 706, computer-implemented method 700 can comprise extrapolating, by the system (e.g., via parameter extrapolation system 102 and/or extrapolation component 108), multiple system parameters of multiple parameter sets to determine the starting parameter value.

In some embodiments, at 708, computer-implemented method 700 can comprise employing, by the system (e.g., via parameter extrapolation system 102 and/or extrapolation component 108), at least one of a Lagrangian polynomial, a differential model, a Hamiltonian evolution, a best fit model, or a greedy fit by parameter model to extrapolate one or more system parameters of one or more parameter sets.

In some embodiments, at 710, computer-implemented method 700 can comprise employing, by the system (e.g., via parameter extrapolation system 102, variational component 110, and/or second variational component 202), an optimization function, a variational circuit, a quantum variational circuit, a parameterized quantum circuit, a variational algorithm, a quantum variational algorithm, or a variational quantum eigensolver algorithm to determine the system parameter based on a randomly selected starting parameter value.

In some embodiments, at 712, computer-implemented method 700 can comprise computing, by the system (e.g., via parameter extrapolation system 102, variational component 110, and/or second variational component 202), a minimum value or a maximum value of a cost function.

Figure 8:
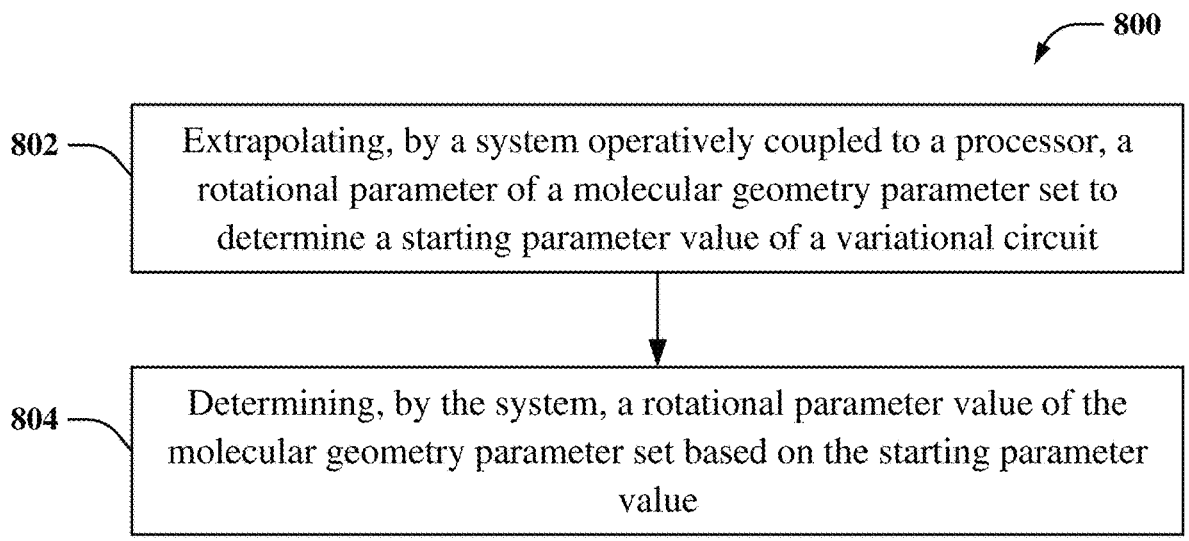
FIG. 8 illustrates a flow diagram of an example, non-limiting computer-implemented method that can facilitate parameter set optimization based on system parameter extrapolation in accordance with one or more embodiments described herein.

FIG. 8 illustrates a flow diagram of an example, non-limiting computer-implemented method 800 that can facilitate parameter set optimization based on system parameter extrapolation in accordance with one or more embodiments described herein. Repetitive description of like elements and/or processes employed in respective embodiments is omitted for sake of brevity.

In some embodiments, at 802, computer-implemented method 800 can comprise extrapolating, by a system (e.g., via parameter extrapolation system 102 and/or extrapolation component 108) operatively coupled to a processor (e.g., processor 106), a rotational parameter (e.g., a maximum or minimum rotational parameter value) of a molecular geometry parameter set to determine a starting parameter value of a variational circuit (e.g., a VQE algorithm).

In some embodiments, at 804, computer-implemented method 800 can comprise determining, by the system (e.g., via parameter extrapolation system 102 and/or variational component 110), a rotational parameter value (e.g., a maximum or minimum rotational parameter value) of the molecular geometry parameter set based on the starting parameter value.

Figure 9:
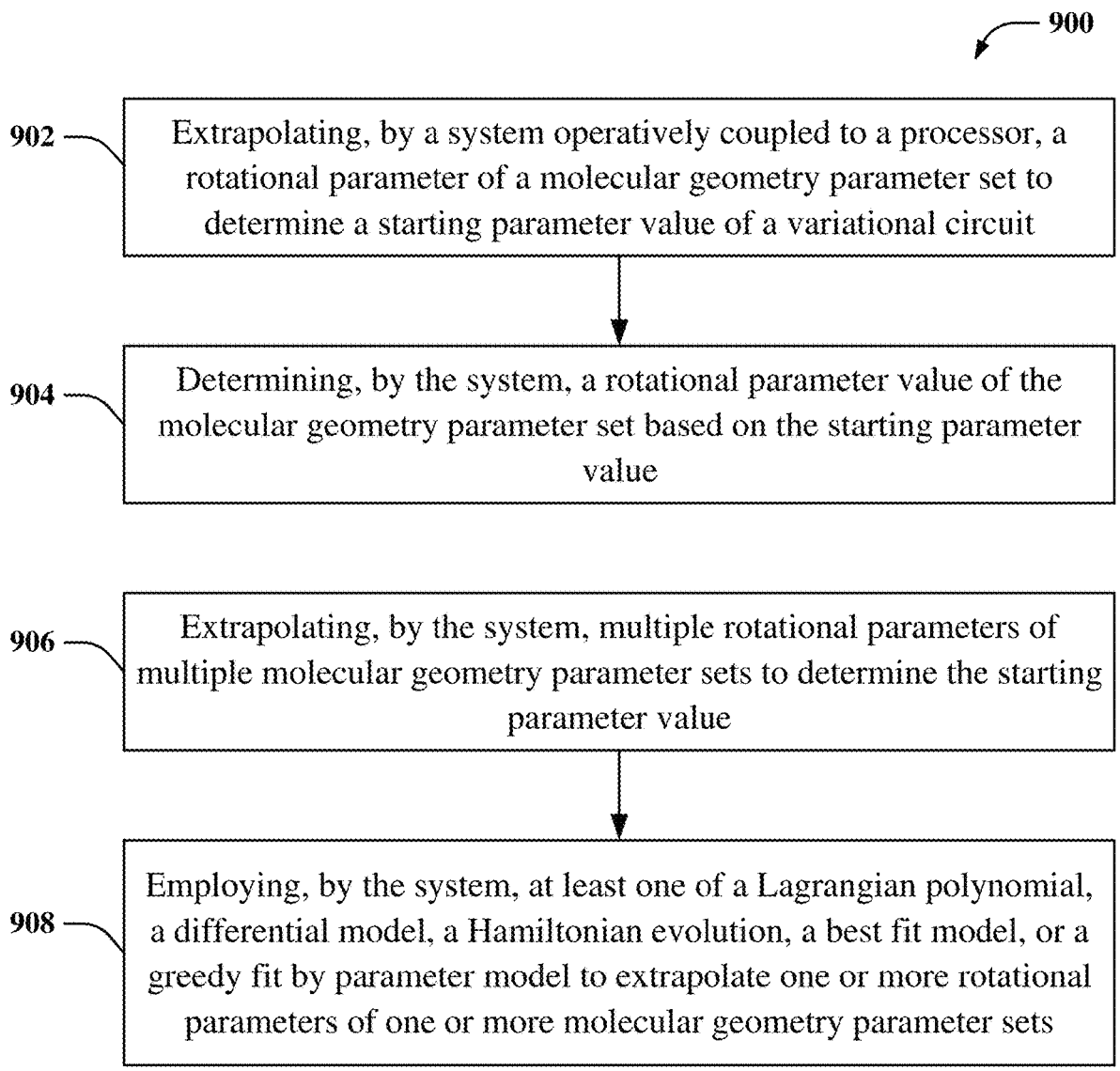
FIG. 9 illustrates a flow diagram of an example, non-limiting computer-implemented method that can facilitate parameter set optimization based on system parameter extrapolation in accordance with one or more embodiments described herein.

FIG. 9 illustrates a flow diagram of an example, non-limiting computer-implemented method 900 that can facilitate parameter set optimization based on system parameter extrapolation in accordance with one or more embodiments described herein. Repetitive description of like elements and/or processes employed in respective embodiments is omitted for sake of brevity.

In some embodiments, at 902, computer-implemented method 900 can comprise extrapolating, by a system (e.g., via parameter extrapolation system 102 and/or extrapolation component 108) operatively coupled to a processor (e.g., processor 106), a rotational parameter (e.g., a maximum or minimum rotational parameter value) of a molecular geometry parameter set to determine a starting parameter value of a variational circuit (e.g., a VQE algorithm).

In some embodiments, at 904, computer-implemented method 900 can comprise determining, by the system (e.g., via parameter extrapolation system 102 and/or variational component 110), a rotational parameter value (e.g., a maximum or minimum rotational parameter value) of the molecular geometry parameter set based on the starting parameter value.

In some embodiments, at 906, computer-implemented method 900 can comprise extrapolating, by the system (e.g., via parameter extrapolation system 102 and/or extrapolation component 108), multiple rotational parameters of multiple molecular geometry parameter sets to determine the starting parameter value.

In some embodiments, at 908, computer-implemented method 900 can comprise employing, by the system (e.g., via parameter extrapolation system 102 and/or extrapolation component 108), at least one of a Lagrangian polynomial, a differential model, a Hamiltonian evolution, a best fit model, or a greedy fit by parameter model to extrapolate one or more rotational parameters of one or more molecular geometry parameter sets.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
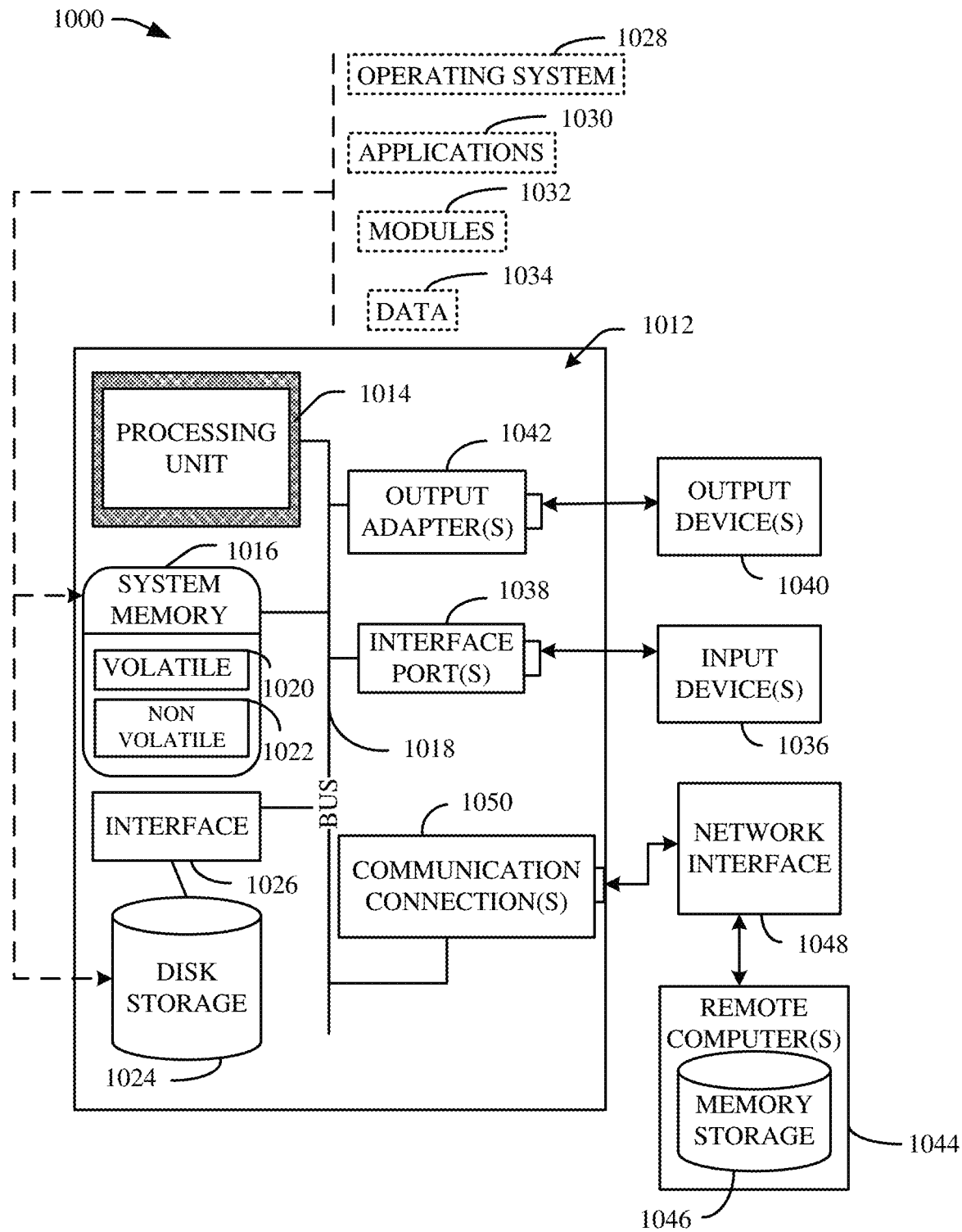
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
  a quantum processor;
  a memory that stores computer executable instructions; and
  a classical processor that executes the computer executable instructions stored in the memory to perform operations comprising:
    iteratively training, until a defined criterion is satisfied, a quantum variational circuit, for performing simultaneous quantum computations on multidimensional spaces, to determine parameter values for quantum system parameters of parameter sets for points of dissociation curves associated with quantum system variational problems, wherein the iterative training comprises:
    determining, using a classical optimization model comprising a greedy fit by parameter model, respective extrapolation methods for the quantum system parameters, wherein at least two of the respective extrapolation methods are different,
    extrapolating, via the classical optimization model, using the respective extrapolation methods for the quantum system parameters, respective parameter values for the quantum system parameters previously determined by the quantum variational circuit for one or more points of a dissociation curve for the quantum system parameters to determine starting parameter values of the quantum variational circuit for the quantum system parameters, and
    executing, using the quantum processor, the quantum variational circuit to determine respective parameter values for the quantum system parameters for a next point of the dissociation curve based on the starting parameter values,
  wherein the iterative training reduces a number of evaluations performed by the quantum variational circuit to determine the respective parameter values as compared to not performing the extrapolation on the respective parameter values for the quantum system parameters previously determined by the quantum variational circuit to determine the starting parameter values for the quantum variational circuit.

2. The system of claim 1, wherein the operations further comprise:
  executing, using the quantum processor, the quantum variational circuit to determine respective first parameter values for the quantum system parameters for a first point of the one or more points of the dissociation curve based on randomly selected starting parameter values.

3. The system of claim 1, wherein the respective parameter values comprise multiple parameter values, thereby facilitating at least one of reduced evaluation of the quantum system parameters or improved processing performance of the classical processor.

4. The system of claim 1, wherein the respective extrapolation methods comprise at least one of a Lagrangian polynomial, a differential model, or a Hamiltonian evolution.

5. The system of claim 1, wherein the quantum variational circuit comprises at least one of an optimization function, a parameterized quantum circuit, a variational algorithm, a quantum variational algorithm, or a variational quantum eigensolver algorithm.

6. The system of claim 1, wherein the iterative training further comprises determining, using the classical optimization model, a minimum value or a maximum value of a cost function associated with the quantum system parameters.

7. The system of claim 1, wherein the parameter sets further comprises at least one of a classical cost function or a Hamiltonian operator.

8. A computer-implemented method, comprising:
    iteratively training, by a system, via a classical processor, until a defined criterion is satisfied, a quantum variational circuit, for performing simultaneous quantum computations on multidimensional spaces, to determine parameter values for quantum system parameters of parameter sets for points of dissociation curves associated with quantum system variational problems, wherein the iterative training comprises:
        determining, using a classical optimization model comprising a greedy fit by parameter model, respective extrapolation methods for the quantum system parameters, wherein at least two of the respective extrapolation methods are different,
        extrapolating, via the classical optimization model, using the respective extrapolation methods for the quantum system parameters, respective parameter values for the quantum system parameters previously determined by the quantum variational circuit for one or more points of a dissociation curve for the quantum system parameters to determine starting parameter values of the quantum variational circuit for the system parameters, and
        executing, via a quantum processor, the quantum variational circuit to determine respective parameter values for the quantum system parameters for a next point of the dissociation curve based on the starting parameter values,
    wherein the iterative training reduces a number of evaluations performed by the quantum variational circuit to determine the respective parameter values as compared to not performing the extrapolation on the respective parameter values for the quantum system parameters previously determined by the quantum variational circuit to determine the starting parameter values for the quantum variational circuit.

9. The computer-implemented method of claim 8, further comprising: executing, by the system, via the quantum processor, the quantum variational circuit to determine respective first parameter values for the quantum system parameters for a first point of the one or more points of the dissociation curve based on randomly selected starting parameter values.

10. The computer-implemented method of claim 8, wherein the respective extrapolation methods comprise at least one of a Lagrangian polynomial, a differential model, or a Hamiltonian evolution.

11. The computer-implemented method of claim 8, wherein the quantum variational circuit comprises at least one of an optimization function, a parameterized quantum circuit, a variational algorithm, a quantum variational algorithm, or a variational quantum eigensolver algorithm.

12. The computer-implemented method of claim 8, wherein the iterative training further comprises:
    determining, via the classical optimization model, a minimum value or a maximum value of a cost function associated with the quantum system parameters.

13. A computer program product facilitating parameter set optimization based on quantum system parameter extrapolation, the computer program product comprising a computer readable storage medium having program instructions embodied therewith, the program instructions executable by a classical processor to cause the classical processor to:
    iteratively train, until a defined criterion is satisfied, a quantum variational circuit, for performing simultaneous quantum computations on multidimensional spaces, to determine parameter values for quantum system parameters of parameter sets for points of dissociation curves associated with quantum system variational problems, wherein the iterative training comprises:
        determining using a classical optimization model comprising a greedy fit by parameter model, respective extrapolation methods for the quantum system parameters, wherein at least two of the respective extrapolation methods are different,
        extrapolating, via the classical optimization model, using the respective extrapolation methods for the quantum system parameters, respective parameter values for the quantum system parameters previously determined by the quantum variational circuit for one or more points of a dissociation curve for the quantum system parameters to determine starting parameter values of the quantum variational circuit for the quantum system parameters, and
        executing, using a quantum processor, the quantum variational circuit to determine respective parameter values for the quantum system parameters for a next point of the dissociation curve based on the starting parameter values,
    wherein the iterative training reduces a number of evaluations performed by the quantum variational circuit to determine the respective parameter values as compared to not performing the extrapolation on the respective parameter values for the quantum system parameters previously determined by the quantum variational circuit to determine the starting parameter values for the quantum variational circuit.

14. The computer program product of claim 13, wherein the program instructions are further executable by the classical processor to cause the classical processor to:
    execute, using the quantum processor, the quantum variational circuit to determine respective first parameter values for the quantum system parameters for a first point of the one or more points of the dissociation curve based on randomly selected starting parameter values.

15. The computer program product of claim 13, wherein the respective extrapolation methods comprise at least one of a Lagrangian polynomial, a differential model, or a Hamiltonian evolution.

16. The computer program product of claim 13, wherein the quantum variational circuit comprises at least one of an optimization function, a parameterized quantum circuit, a variational algorithm, a quantum variational algorithm, or a variational quantum eigensolver algorithm.

17. The computer program product of claim 13, wherein the iterative training further comprises:
 determining, via the classical optimization model, a minimum value or a maximum value of a cost function associated with the quantum system parameters.

18. A system, comprising:
 a quantum processor;
 a memory that stores computer executable instructions; and
 a classical processor that executes the computer executable instructions stored in the memory to perform operations comprising:
  iteratively training, until a defined criterion is satisfied, a quantum variational circuit, for performing simultaneous quantum computations on multidimensional spaces, to determine rotational parameter values for molecular geometry parameters of quantum systems for points of dissociation curves associated with quantum system variational problems, wherein the iterative training comprises:
   determining, using a classical optimization model comprising a greedy fit by parameter model, respective extrapolation methods for the molecular geometry parameters, wherein at least two of the respective extrapolation methods are different,
   extrapolating, via the classical optimization model, using the respective extrapolation methods for the molecular geometry parameters, respective rotational parameter values for the molecular geometry parameters previously determined by the quantum variational circuit for one or more points of a dissociation curve for the molecular geometry parameters to determine starting parameter values of the quantum variational circuit for the molecular geometry parameters, wherein the dissociation curve represents ground state energy of a molecule, and
   executing, using the quantum processor, the quantum variational circuit to determine respective rotational parameter values for the molecular geometry parameters for a next point of the dissociation curve based on the starting parameter values,
  wherein the iterative training reduces a number of evaluations performed by the quantum variational circuit to determine the respective rotational parameter values as compared to not performing the extrapolation on the respective rotational parameter values for the molecular geometry parameters previously determined by the quantum variational circuit to determine the starting parameter values for the quantum variational circuit.

19. The system of claim 18, wherein the operations further comprise:
 executing, using the quantum processor, the quantum variational circuit to determine respective first rotational parameter values for the molecular geometry parameters for a first point of the one or more points of the dissociation curve based on randomly selected starting parameter values.

20. The system of claim 18, wherein the respective extrapolation methods comprise at least one of a Lagrangian polynomial, a differential model, or a Hamiltonian evolution.

21. The system of claim 18, wherein the quantum variational circuit comprises an optimization function, a parameterized quantum circuit, a variational algorithm, a quantum variational algorithm, or a variational quantum eigensolver algorithm.

22. A computer-implemented method, comprising:
 iteratively training, by a system, via a classical processor, until a defined criterion is satisfied, a quantum variational circuit, for performing simultaneous quantum computations on multidimensional spaces, to determine rotational parameter values for molecular geometry parameters of quantum systems for points of dissociation curves associated with quantum system variational problems, wherein the iterative training comprises:
  determining, using a classical optimization model comprising a greedy fit by parameter model, respective extrapolation methods for the molecular geometry parameters, wherein at least two of the respective extrapolation methods are different,
  extrapolating, via the classical optimization model, using the respective extrapolation methods for the molecular geometry parameters, respective rotational parameter values for the molecular geometry parameters previously determined by the quantum variational circuit for one or more points of a dissociation curve for the molecular geometry parameters to determine starting parameter values of the quantum variational circuit for the molecular geometry parameters, wherein the dissociation curve represents dipole moment of a molecule, and
  executing, via a quantum processor, the quantum variational circuit to determine respective rotational parameter values for the molecular geometry parameters for a next point of the dissociation curve based on the starting parameter values,
 wherein the iterative training reduces a number of evaluations performed by the quantum variational circuit to determine the respective rotational parameter values as compared to not performing the extrapolation on the respective rotational parameter values for the molecular geometry parameters previously determined by the quantum variational circuit to determine the starting parameter values for the quantum variational circuit.

23. The computer-implemented method of claim 22, further comprising:
 executing, by the system, via the quantum processor, the quantum variational circuit to determine respective first rotational parameter values for the molecular geometry parameters for a first point of the one or more points of the dissociation curve based on randomly selected starting parameter values.

24. The computer-implemented method of claim 22, wherein the respective extrapolation methods comprise at least one of a Lagrangian polynomial, a differential model, or a Hamiltonian evolution.

25. The computer-implemented method of claim 22, wherein the quantum variational circuit comprises an optimization function, a parameterized quantum circuit, a variational algorithm, a quantum variational algorithm, or a variational quantum eigensolver algorithm.

\* \* \* \* \*